United States Patent [19]

Eisele

[11] Patent Number: 5,767,397

[45] Date of Patent: Jun. 16, 1998

[54] METHOD AND APPARATUS FOR TESTING THE BRAKE SYSTEM OF A VEHICLE

[75] Inventor: Uwe Eisele, Villingen, Germany

[73] Assignee: Robert Bosch GmbH, Stuttgart, Germany

[21] Appl. No.: 751,128

[22] Filed: Nov. 15, 1996

[30] Foreign Application Priority Data

Feb. 3, 1996 [DE] Germany ............... 196 03 909.6

[51] Int. Cl.[6] ............... G01M 19/00; B60T 17/22; G01L 5/28

[52] U.S. Cl. ............... 73/121; 73/129; 73/39; 340/452; 340/453; 364/426.01

[58] Field of Search ............... 73/121, 122, 126, 73/129, 39; 340/452, 453, 454; 364/426.01

[56] References Cited

U.S. PATENT DOCUMENTS

| | | | |
|---|---|---|---|
| 3,974,687 | 8/1976 | Asmus et al. | 73/126 |
| 4,050,298 | 9/1977 | Hope et al. | 73/121 |
| 4,083,032 | 4/1978 | Nakamura et al. | 340/452 |
| 4,100,792 | 7/1978 | Leiber | 73/121 |
| 4,824,182 | 4/1989 | Steffes et al. | 73/121 |
| 5,074,145 | 12/1991 | Hattori et al. | 73/121 |
| 5,132,664 | 7/1992 | Feldmann et al. | 340/452 |
| 5,357,800 | 10/1994 | Reuter et al. | 73/121 |
| 5,378,052 | 1/1995 | Yoshino | 340/453 |

FOREIGN PATENT DOCUMENTS

| | | |
|---|---|---|
| 4112137 | 11/1992 | Germany. |
| 1400335 | 9/1975 | United Kingdom. |
| 1476482 | 6/1977 | United Kingdom. |
| 2218764 | 11/1989 | United Kingdom. |

*Primary Examiner*—George M. Dombroske
*Attorney, Agent, or Firm*—Felfe & Lynch

[57] ABSTRACT

In at least one operating situation, especially while the vehicle is stopped, pressure is built up in a defined manner and then released for test purposes without waiting for a steady state value to be reached. On the basis of the pressure-time or force-time curve in at least one wheel brake, a determination is made on whether or not an unacceptable amount of undissolved gas is present in the brake system.

12 Claims, 3 Drawing Sheets

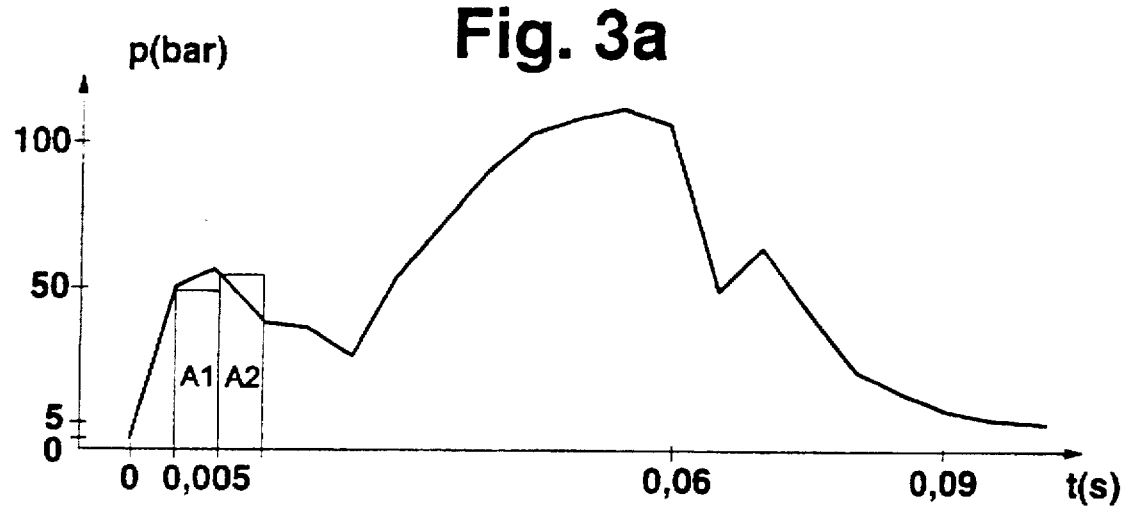
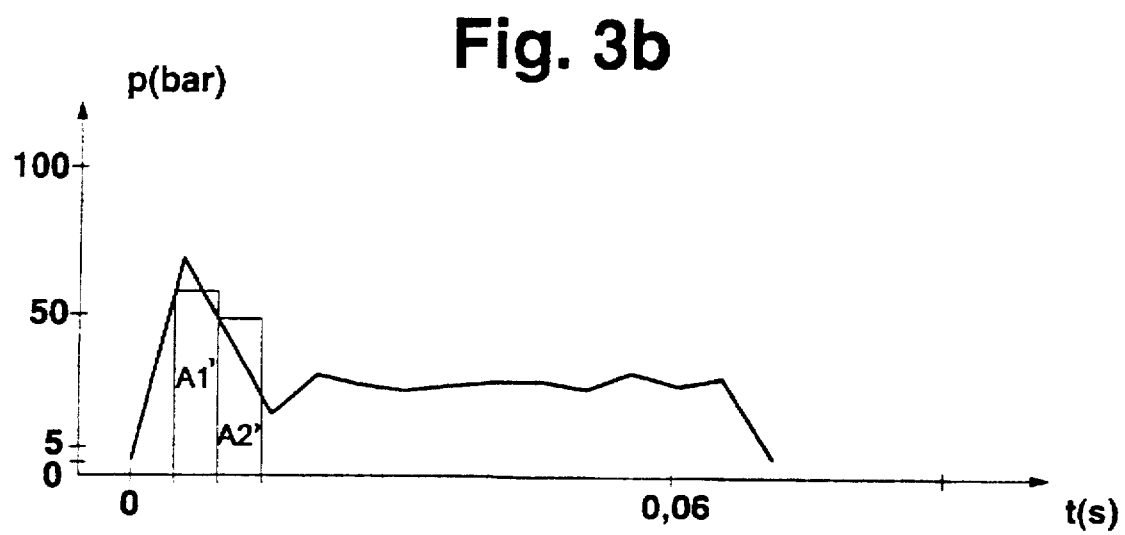
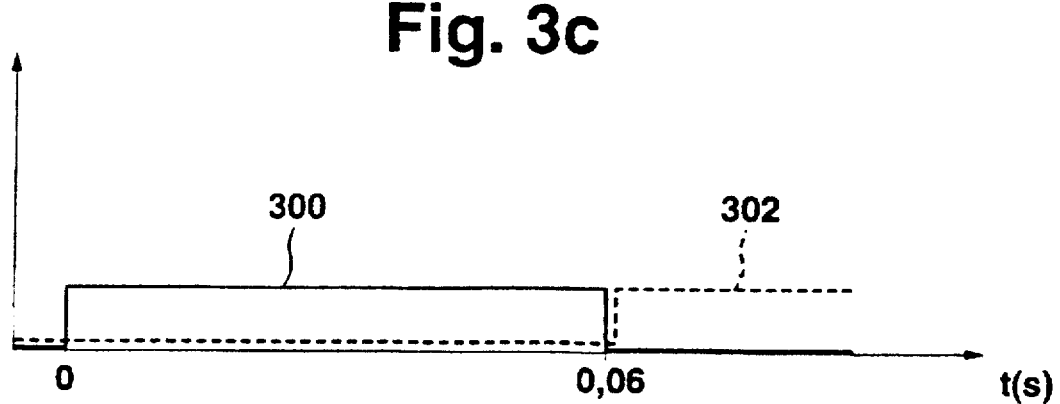

METHOD AND APPARATUS FOR TESTING THE BRAKE SYSTEM OF A VEHICLE

BACKGROUND OF THE INVENTION

The invention pertains to a method and to an apparatus for testing the brake system of a vehicle having electrically actuated valves at the brakes.

A brake system for a vehicle in which the brake pressure in the wheel brakes of the vehicle is adjusted by the actuation of a valve assembly as a function of the braking command derived from the driver's actuation of the brake pedal is known from DE-A 41 12 137. In an electrical brake system such as this, it is also provided that, if the electrical control fails, a conventional hydraulic control of the wheel brakes depending on the actuation of the brake pedal can be activated. When the electrical control fails, the driver can therefore decelerate the vehicle and bring it to a stop by actuating the brake pedal. To do this, he must apply the required brake pressure to the wheel brakes by way of the pedal and the brake cylinder of the hydraulic brake system. To ensure the operational reliability of this electro-hydraulic brake system, it is necessary for this emergency system to be tested even during normal operating conditions, because a failure of the emergency system after the breakdown of the electrical control can lead to the failure of the entire brake system. A particular problem in this context is the presence of an unacceptable amount of undissolved gas in the brake fluid of the closed emergency brake circuit.

SUMMARY OF THE INVENTION

The object of the invention is to provide measures for testing the brake system of a vehicle by means of which an emergency brake system of an electro-hydraulic brake can be tested especially with respect to the presence of undissolved gas in the hydraulic circuit.

This is achieved by building up pressure in a defined manner and releasing the pressure before a steady state pressure is reached. A plot of the pressure versus time is evaluated to determine if undissolved gas is present in the system, preferably by integrating and comparing the resulting integral with a predetermined value which represents an integral for the system without any gas in the hydraulic fluid.

The solution according to the invention ensures the operational reliability of an electro-hydraulic brake system with a hydraulic emergency brake system. Especially advantageous is that this testing can occur even while the brake system is operating normally.

Not only can an unacceptable amount of undissolved gas in the brake fluid of the brake system can be detected, but very small amounts of gas can be detected.

The test to be conducted to detect gas can be completed in a very short period of time, i.e., in 250 msec or so, and the quantity or volume of gas in the brake fluid can be determined.

It is especially advantageous that the dynamic behavior of the change in pressure is taken into consideration in the evaluation.

No additional sensors are required for this test. The test is based solely on the signals from sensors which are already present.

Since the presence of gas is detected by the controlled buildup of pressure in the individual wheel brakes, different sections of brake line can be studied independently of each other for the presence of unacceptable quantities of gas.

Additional advantages can be derived from the following description of exemplary embodiments.

DESCRIPTION OF THE DRAWING

FIG. 3a is a graph of pressure versus time at a wheel brake in the absence of any gas;

FIG. 3b is a graph of pressure versus time when the brake fluid contains gas; and FIG. 3c shows the actuation signals for the pressure buildup value and the pressure release valve.

DESCRIPTION OF EXEMPLARY EMBODIMENTS

Figure 1:
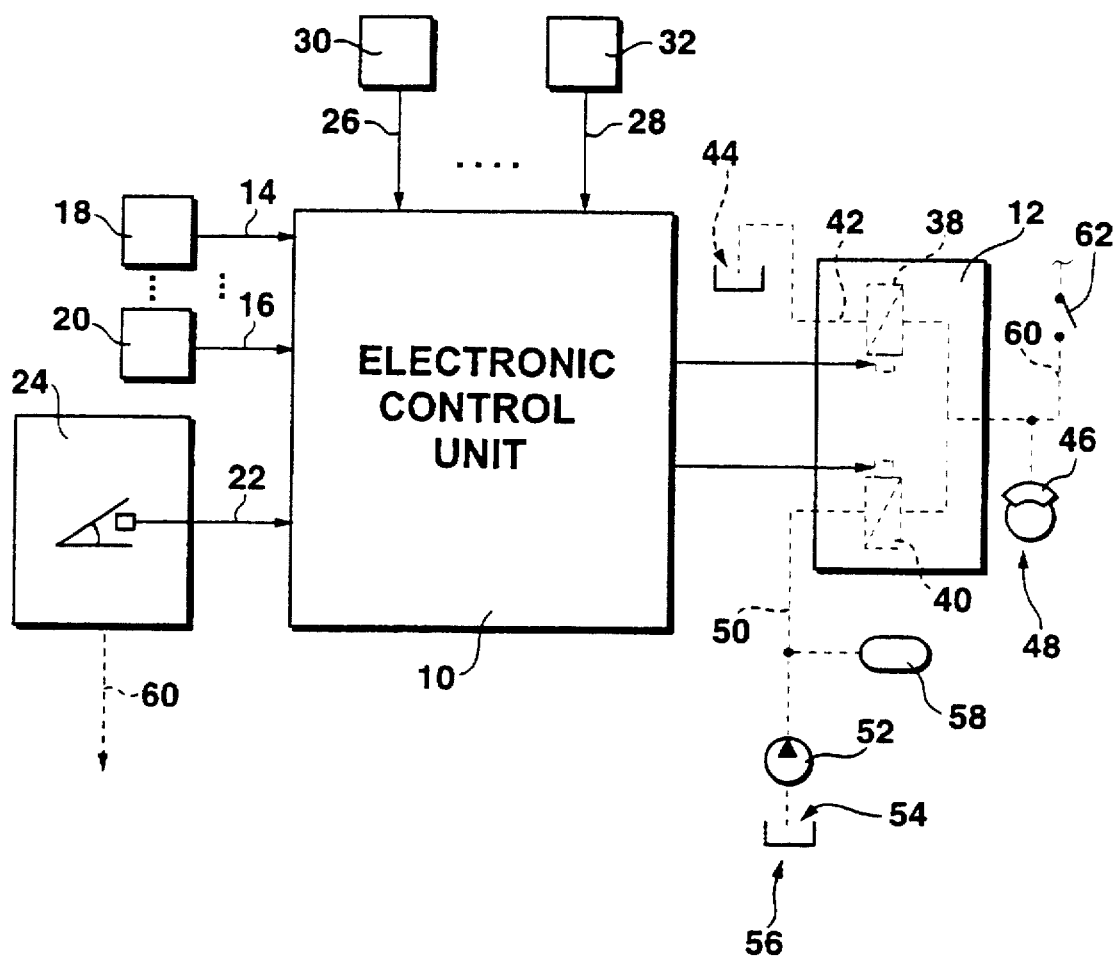
FIG. 1 shows a block circuit diagram of an electro-hydraulic brake system.

FIG. 1 shows a block circuit diagram of an electro-hydraulic brake system of a vehicle. An electronic control unit 10 is shown, which controls a hydraulic brake system 12 provided with appropriate valve assemblies. Connected to this unit 10 are input lines 14–16 from measuring devices 18–20 for detecting the braking pressures, moments, or forces built up in the wheel brakes; an input line 22 from at least one measuring device 24 for detecting the extent to which the brake pedal is actuated; and input lines 26–28 from measuring devices 30–32 for detecting additional operating variables of the brake system or of the vehicle such as wheel speeds, vehicle velocity, etc., are connected to electronic control unit 10. Electronic control unit 10 controls the electrically actuated valves of hydraulic brake system 12 over output lines. For reasons of clarity, only output lines 34 and 36 are shown, which drive pressure release valve 38 and pressure buildup valve 40 assigned to a wheel brake.

Pressure release valve 38, which, in the preferred exemplary embodiment, is in the closed position when unactuated and in the open position when actuated, is inserted in a hydraulic line 42, illustrated in broken line, which leads from a reservoir 44 to brake cylinder 46 of a wheel 48. In a corresponding manner, pressure buildup valve 40, which, in the preferred exemplary embodiment, is also in the closed state when not actuated and open when actuated, is inserted in a hydraulic line 50, which leads from a pressure-generating pump 52 to wheel brake 46. On the intake side, pump 52 is connected by way of a hydraulic line 54 to a reservoir 56, which can be identical to reservoir 44. A high-pressure hydraulic medium storage chamber 58 is connected to hydraulic line 50. In addition, the pressure in wheel brake cylinders 46 can be influenced directly by the driver by actuation of the brake pedal via hydraulic line 60, which is connected to wheel brake 46 and also to the master brake cylinder, not shown. This connection is active only in the case of a defect in the electrical system, which is symbolized in FIG. 1 by a switching element 62.

For reasons of clarity, the hydraulic part of the brake system is illustrated for only one wheel brake. Corresponding assemblies are present at least for the wheel brakes of the same axle or for all wheel brakes of the vehicle.

Under normal operating conditions, electronic control unit 10 determines the driver's braking command from the degree of actuation of the brake pedal, which is transmitted over line 22. This command is converted to a desired value for the brake pressure to be produced at the individual wheel brakes. Within the scope of a pressure control circuit, this pressure is produced by the actuation of valves 38, 40 under consideration of the measured pressure. While the pressure is being built up, pressure medium flows from the reservoir via pump 52 and/or from storage chamber 58 via line 50 through open pressure buildup valve 40 and into wheel brake 46. So that the pressure can be released, pressure buildup valve 40 is closed, and pressure release valve 38 is opened so that pressure medium can flow back to the reservoir through line 42. Electronic control unit 10 also comprises an antilock and/or drive slip controller, which monitors the wheel speeds and can release or build up the pressure in the appropriate wheel brake when one or more of the wheels is showing a tendency to lock or spin.

In other advantageous exemplary embodiments, the driver's brake command is realized not only by the regulation of the pressure in the wheel brakes but also by the regulation of the braking moment, the braking force, the wheel speed, the wheel slip, etc.

If the electronic control unit fails after the loss of supply voltage, for example, or in cases of problems with electronic control unit 10, etc., the hydraulic emergency brake system is activated, so that the driver can take direct action on the wheel brakes to decelerate the vehicle. If, after the electronic control system has failed, an unacceptably large amount of undissolved gas is present in the hydraulic emergency brake circuit, the driver cannot build up enough braking force in the wheel brakes. This can result in unwanted operating situations.

It is therefore provided in accordance with the invention that, as part of a testing procedure, the presence of undissolved gas in the hydraulic fluid of the brake system can be recognized promptly.

This test is implemented in certain driving situations, such as while the vehicle is stopped before driving begins, while the vehicle is not moving but the brake is not being actuated (e.g., at a traffic signal), etc. To detect an unacceptably large amount of undissolved gas in the emergency brake circuit, pressure is built up in a defined manner in at least one wheel brake in at least one of the operating situations described above at least once during an operating cycle of the vehicle or as a function of a predetermined operating time and then released again immediately. The pressure release valves are closed during the pressure buildup pulse, so that a certain volume is fed from the storage chamber into the brake lines and wheel calipers of at least one wheel of the brakes. The change in pressure is recorded by pressure sensors near at least one of the wheel brakes. The result of the test is a characteristic curve of pressure versus time for the wheel brakes in which pressure was built up. This pressure curve shows significant a difference between the case in which undissolved gas is present in the brake fluid and the case in which it is not.

In a preferred exemplary embodiment, it has been found suitable to evaluate the integral of this pressure curve. The value of this integral is a measure of the state of aeration or deaeration of the brake system. It decreases with increasing gas content and increases with decreasing gas content. The reason for this is that the compressibility of gases/air is orders of magnitude greater than that of liquids. Therefore, when the pressure is increased, the air or gas is compressed first, before there is any significant increase in the pressure in the system. By means of a suitably selected pressure buildup pulse, the time which the system requires to compress the air is used to establish a clear-cut difference in the integrals. In the preferred exemplary embodiment, a pressure of more than 5 bars has been specified as a boundary condition for the determination of the integral. The accuracy of the integral calculation is determined by the sampling rate of the computer system.

As a result of the evaluation of the integral over time, the dynamic behavior of the hydraulic system can be included in the evaluation. Experiments have shown that even very small amounts of air can be detected by this method. Because the value of the integral is a measure of the gas content, the quantity or volume of gas can be determined from stored characteristic values.

In other exemplary embodiments, it is not the integral of the pressure-time curve which is determined but rather a comparable measurement variable such as an average value of the pressure over time, a variable representing the maximum achieved pressure value, etc.

Figure 2:
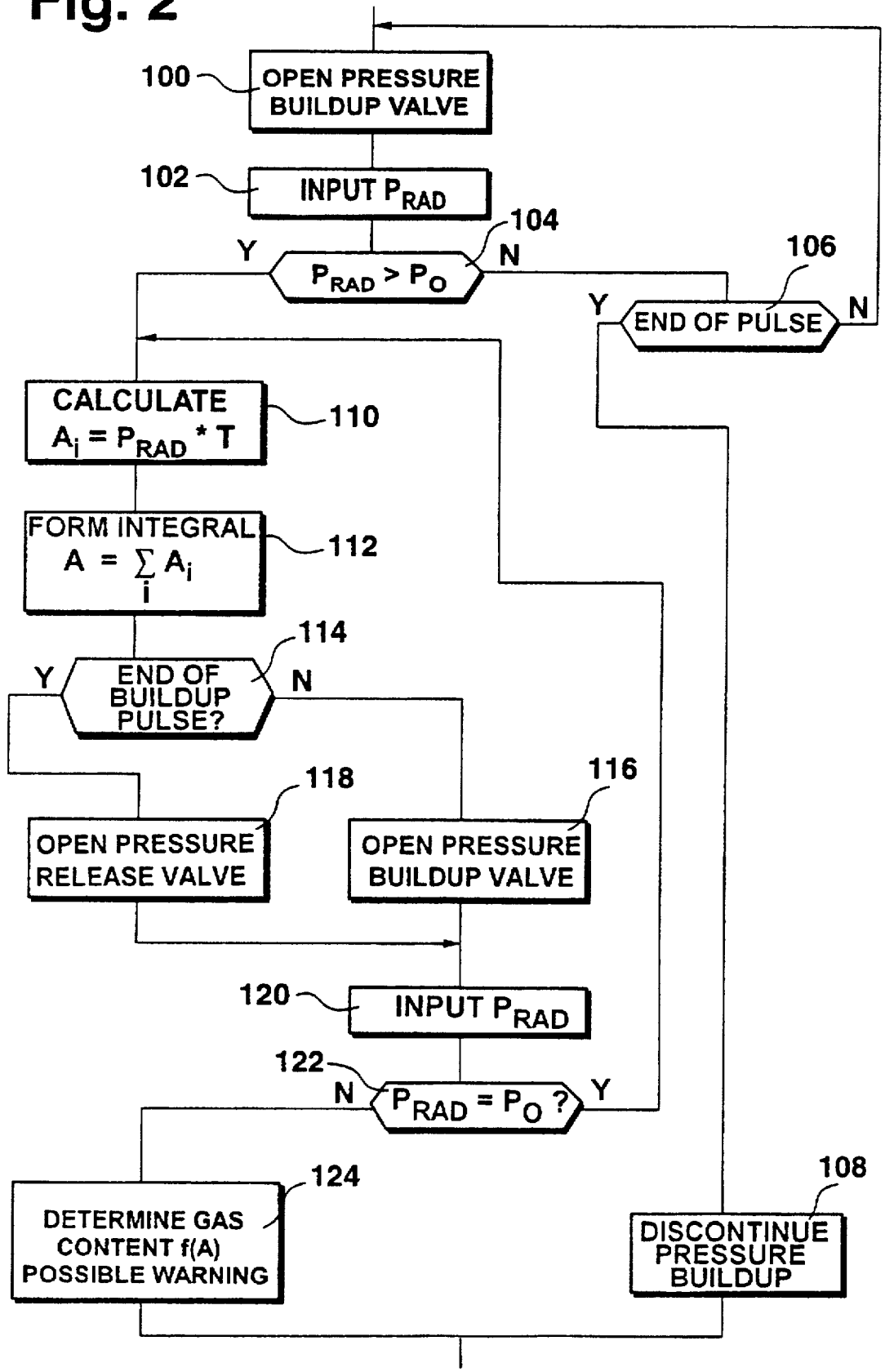
FIG. 2 is a flow chart illustrating the preferred exemplary embodiment.

In the preferred exemplary embodiment, the invention is realized as a program running on the microcomputer present in the electronic control unit. An example of a program of this type within the scope of a preferred embodiment is illustrated on the basis of the flow chart in FIG. 2.

The subprogram presented there is initiated in at least one of the operating situations indicated, possibly as a function of the operating cycle of the drive unit or as a function of the operating time of the vehicle. After the subprogram has started, in step 100 the pressure buildup valve is actuated to open it, that is, to allow the pressure to build up in the assigned wheel brake, by an appropriate signal transmitted over one of the output lines of the control unit. Thereupon, in step 102, the pressure $P_{RAD}$ in the area of the wheel brake is detected and compared in the following step 104 with a predetermined limit value $P_0$. In the preferred exemplary embodiment, this value is 5 bars. If the pressure value does not exceed the limit, then in step 106 the program checks to see whether the predetermined time for the pressure buildup pulse has expired. In a preferred exemplary embodiment, a pulse length of 60 msec has been found to be suitable. If this time since the start of the subprogram, that is, since the transmission of the pressure buildup pulse, has not yet expired, the subprogram continues with step 100. But if the time has expired without the pressure having increased above 5 bars, the solution according to the invention cannot be implemented. Then, in the next step 108, any pressure built up in the wheel brake is released by the appropriate actuation of the pressure release valve. Then the subprogram terminates and, in the preferred exemplary embodiment, is initiated again, after a failure to complete the test of the brake system, during the same operating cycle when one of the appropriate operating situations occurs again.

If step 104 has shown that the pressure in the wheel brake exceeds the limit, the integral of curve segment $A_i$ is calculated for the current run through of the program or for the current sampling time as the product of the determined pressure value $P_{RAD}$ and the sampling or program repeat interval T. Then, in step 112, the integral A is formed by the addition of the integral segments $A_i$ which were found. In the next step 114, the program checks to see whether the time provided for the buildup pulse has expired. If this is not the case, the state of actuation for the pressure buildup valve is maintained in step 116. If it is found in step 114 that the buildup pulse has ended, then in step 118 the pressure release valve is actuated to release the pressure built up in the wheel brake. After steps 116, 118, the current pressure $P_{RAD}$ is accepted as input in step 120 and is compared in the following step 122 with a predetermined limit value $P_0$. If the pressure is greater than the predetermined limit value, the program continues with steps 110, 112 and the rest of the process of calculating the integral. If the pressure has fallen below the limit value, then in step 124 the program determines on the basis of integral A whether there is an unacceptably large amount of dissolved gas in the brake fluid of the brake system or not. In another embodiment, the gas content (quantity and/or volume) is determined on the basis of the integral value with the help of experimental values. If it is found that the gas content is unacceptably high, the driver is informed and/or emergency measures initiated. After step 124, the subprogram terminates.

FIG. 3 shows typical time curves. FIG. 3a shows the pressure-time curve at a wheel brake for a pressure buildup pulse 60 msec long and the subsequent release of pressure in the absence of gas. FIG. 3b shows the corresponding pressure-time curve for a brake fluid containing 3 ccm of gas. FIG. 3c, finally, shows the actuation signals for the pressure buildup valve (300) and the pressure release valve (302).

At time t=0, the pressure buildup valve of at least one wheel brake is actuated so as to build up the pressure (see curve 300 in FIG. 3c). This leads to a characteristic pressure buildup curve as shown in FIGS. 3a and 3b. When the pulse ends (after 60 msec in the preferred embodiment), the pressure buildup valve is closed, and the previously closed pressure release valve is opened (see curve 302 in FIG. 3c). This leads from this point on to a drop in the pressure, as illustrated in FIGS. 3a and 3b. Let the sampling time of the computer system in the exemplary embodiment illustrated in FIG. 3 be 5 msec. At the first sampling point, which occurs after the pressure has exceeded the pressure limit $P_0$ of 5 bars, the first integral element $A_1$, or $A_1'$ is calculated. This calculation is carried out for each element until the pressure falls back below the pressure limit value $P_0$ of 5 bars. This occurs in FIG. 3a after 90 msec, in FIG. 3b after 70 msec. Then the integral calculation is ended, and the determined result is compared with typical comparison values obtained for the specific brake system in question, which represent the integral for a predetermined amount of gas (preferably zero) in the brake system. If the determined integral value is smaller than this comparison value, it is assumed that undissolved gas is present in the brake system.

In a preferred exemplary embodiment, the exact gas content is determined as a quantity and/or volume from predetermined, stored values for the integral and then stored appropriately.

In a preferred exemplary embodiment, the solution according to the invention is carried out individually for each wheel brake in succession. In another advantageous exemplary embodiment, it has been found suitable to test individual groups of wheel brakes such as those of one axle in parallel according to the solution of the invention or to test all the wheel brakes at the same time in accordance with the solution according to the invention. By actuation of the valves in suitable combinations, it is also possible in an advantageous exemplary embodiment to test relatively large sections of the brake system such as all the feed lines to the wheel brakes of one axle by means of a single measurement procedure. This is achieved, for example, by actuating the pressure buildup valves simultaneously and by testing the pressure buildup at one of the wheel brakes. If undissolved gas is present in the feed lines to the wheel brakes in which the pressure was built up, this will be shown by a characteristic pressure-time curve for the tested wheel brake.

If an unacceptably large amount of undissolved gas has been found in the hydraulic fluid, the driver is informed about the limited availability of the emergency brake circuit; in some advantageous exemplary embodiments he is forced, either alternatively or in addition, by power restrictions, velocity restrictions, etc., to find a repair shop to have the brake system bled.

In the preferred exemplary embodiment, a pressure measurement value is used for evaluation. In other advantageous exemplary embodiments, the test described above is carried out on the basis of other variables representing the force exerted on the brake such as the application force and evaluated according to the invention.

I claim:

1. A method for detecting undissolved gas in a hydraulic brake system of a vehicle having brakes supplied with fluid under hydraulic pressure by electrically actuated valve means, said method comprising building up pressure in at least one wheel brake by actuating said valve means for a predetermined time which is not sufficient for a steady state pressure to be reached, releasing said pressure after said predetermined time, forming a pressure versus time curve during buildup and release of pressure, forming an integral of said pressure versus time curve, comparing said integral to a predetermined value, said predetermined value representing a predetermined amount of undissolved gas in the fluid of the brake system, and informing the driver when said integral is less than said predetermined value by a predetermined amount.

2. Method as in claim 1 wherein said integral is formed over a time when the pressure exceeds a specified limit value.

3. Method for testing the brake system of a vehicle having brakes supplied with hydraulic pressure by electrically actuated valve means said method comprising:

building up pressure in at least one wheel brake by actuating said valve means for a predetermined time which is not sufficient for a steady state pressure to be reached;

releasing said pressure after said predetermined time;

forming a pressure versus time curve during buildup and release of pressure;

forming an integral of said pressure versus time curve;

comparing said integral to a predetermined value; and informing the driver when said integral is less than said predetermined value by a predetermined amount;

said predetermined value representing a integral representing a predetermined amount of undissolved gas in the brake system.

4. Method as in claim 3 wherein said predetermined amount of undissolved gas is none.

5. A method for detecting undissolved gas in a brake fluid in hydraulic brake system of a vehicle in which pressure is built up and released in at least one wheel brake by electrically actuated valves, said method comprising:

building up and then releasing pressure in at least one of the wheel brakes for testing purposes in at least one operation situation;

detecting the brake pressure;

determining a characteristic curve of the pressure versus time for the at least one wheel brake in which pressure was built up;

detecting presence of undissolved gas in the brake fluid on the basis of the characteristic curve; and outputting an indication when the presence of undissolved gas is detected.

6. Method according to claim 5, wherein the integral of the pressure-time curve is determined.

7. Method according to claim 6, wherein the integral is determined when the pressure exceeds a specified limit value.

8. Method according to claim 5, wherein said building up of pressure includes sending a pulse of predetermined duration to at least one pressure buildup valve, and at least one pressure release valve is then actuated to release the pressure which was built up.

9. Method according to claim 5, wherein the brake system is an electro-hydraulic brake system, which, under normal operating conditions, builds up or releases the pressure in the wheel brakes as a function of a driver's braking command by actuation of the electrically operated valves, and wherein said detecting of the presence of undissolved gas is performed by an electric control, said brake system, upon a failure of the electric control, allows the brakes to be actuated as a function of the operation of the brake pedal by way of an emergency hydraulic brake circuit.

10. Apparatus for detecting undissolved gas in brake fluid in a brake system of a vehicle, said apparatus comprising:

an electronic control unit building up and then releasing pressure in at least one wheel brake for test purposes in at least one operating situation by actuating electrically operated valves;

said electronic control unit detecting pressure in said at least one wheel brake and determining a characteristic curve of the pressure versus time for the wheel brake in which pressure was built up;

said electronic control unit including means for detecting the presence of undissolved gas in the brake fluid on the basis of the characteristic curve, and said electronic control unit having means for outputting an indication when the presence of undissolved gas is detected.

11. The apparatus according to claim 10, and said electronic control unit using an integral of the characteristic curve to detect the presence of undissolved gas in the brake fluid.

12. The apparatus according to claim 10, and an emergency hydraulic brake circuit in said brake system providing actuation of the brake responsive to the brake pedal in the event of a failure of said electronic control unit.

* * * * *

UNITED STATES PATENT AND TRADEMARK OFFICE
CERTIFICATE OF CORRECTION

PATENT : 5,767,397
DATED : June 16, 1998
INVENTOR(S) : Uwe Eisele

It is certified that error appears in the above-identified patent and that said Letters Patent is hereby corrected as shown below:

On the title page, item [56] References Cited, under U.S. Patent Documents, line 6, change "73/121" to --73/118.1--.

Signed and Sealed this

Thirtieth Day of May, 2000

Attest:

Q. TODD DICKINSON

*Attesting Officer*         *Director of Patents and Trademarks*